Jan. 5, 1937.                M. MAUL                   2,067,157
              PERFORATED RECORD CONTROLLED MACHINE
                 Filed Jan. 29, 1931        2 Sheets-Sheet 1

Inventor:
Michael Maul

Jan. 5, 1937.  M. MAUL  2,067,157
PERFORATED RECORD CONTROLLED MACHINE
Filed Jan. 29, 1931  2 Sheets-Sheet 2

Inventor:
Michael Maul

Patented Jan. 5, 1937

2,067,157

UNITED STATES PATENT OFFICE 2,067,157

PERFORATED RECORD CONTROLLED MACHINE

Michael Maul, Berlin-Johannisthal, Germany

Application January 29, 1931, Serial No. 512,056
In Germany February 17, 1930

3 Claims. (Cl. 235—92)

The present invention relates to perforated record card controlled machines and more particularly to tabulating machines wherein the record card is analyzed during one machine cycle while the entry receiving accumulating mechanism of the machine is controlled in a later and preferably in the subsequent machine cycle in accordance with said analysis but at the same time the subsequent card is analyzed.

In order to obtain such manner of operation it has been suggested to use in a tabulating machine two sets of storing means alternately controlled by the analyzing means and in turn controlling alternately the accumulating mechanism in such manner that the one set of storing means is under card control while the other set controls the accumulating mechanism.

A sorting machine was also already in use wherein some sort of storing means was controlled by the analyzing means while other storing means controlled the sorting chutes and wherein the adjustment of the first storing means was in some way taken over by the second storing means.

It is the main object of the present invention to provide a tabulating machine controlled by combinational hole record cards, wherein a first set of storing means controls between consecutive entering operations a second set of storing means, said first set being in each machine cycle under the control of the analyzing means, and the second set controlling in each machine cycle the entry-receiving accumulating means, and wherein one set of said storing means, preferably the second set, includes translator means for said combinational hole perforations, and it will be understood that accordingly only one of said sets of storing means must include additional means for the purpose of translation and that moreover this one set serves at the same time two purposes.

A further object of the invention is to provide a machine of the type indicated for the analysis of cards while they are in motion past the analyzing means and wherein the analyzing period lasts only a fraction of the whole machine cycle while the accumulating mechanism is during substantially the whole machine cycle under the control of said translator means.

A further object of the invention is to include in said first and second set of storing means latchable set-up members the latches of which are mounted on common latch carriers, means being further provided to move between consecutive entering operations the latch carriers of the first set of set-up members towards the second set of set-up members to latch the latter members in accordance with the latched members in the first set.

Other objects and advantages of the invention will be seen from the following specification and claims and the accompanying drawings:

Fig. 3 shows the perforation code according to which the hole combinations in the record cards are provided; in this figure, the various hole positions are designated at the right by roman numerals.

Fig. 4 shows a fragment of a record card which is punched according to the code in Fig. 3.

Figure 1:
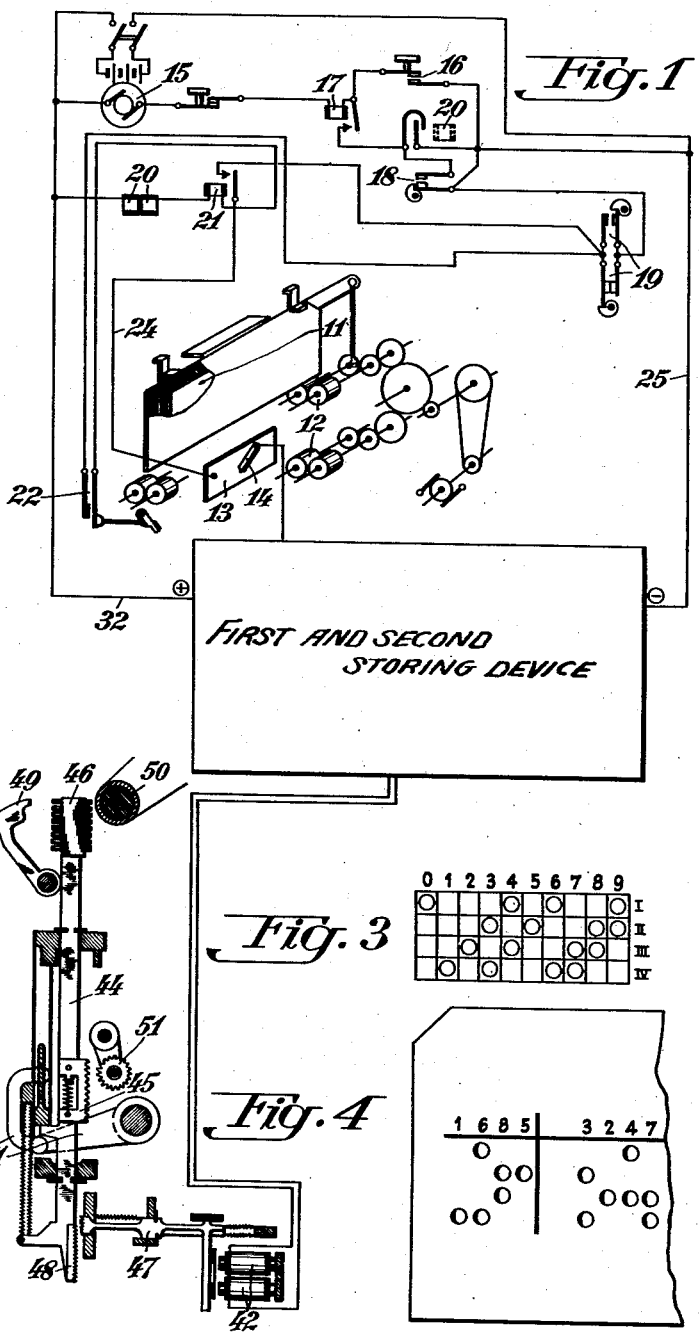
Fig. 1 shows the diagram of a hole combination controlled tabulator in connection with the accumulating and/or printing mechanism of the machine; in this figure, for simplicity of illustration, the two sets of storing means according to the present invention are only indicated by a casing since the respective mechanisms are shown more in detail in Fig. 2.

Fig. 1 shows the well known diagram of an electrical tabulating machine for hole combinations, said hole combinations being translated by a translator mechanism into single impulses. The cards 11 are fed from a stack of cards downwardly one by one by means of a feed knife, and are then fed by feed rollers 12 between the contact plate 13 and the analyzing brush 14 for a certain record column. The drawings show only a single analyzing brush 14 and the two sets of storing means which are coordinated to said brush are shown in form of a casing; the same arrangement must, of course, be provided for each record column. Operation of the machine is started by closure of start contact 16, thereby establishing a current circuit over the tabulator motor 15 and relay 17. By energization of motor relay 17 a stick circuit for the tabulator motor 15 will be established over the armature of relay 17 and cam contacts 18, the latter being closed after the motor has started for operation. The cards are fed by the feed knife and the feed rollers 12 downwardly and close the card contact 22. The well known cam contacts 19 serve to establish a current circuit to the card contact 22 and control the energization of the relays 20 and 21. The contacts 19 close only when the card passes under the brushes and therefore the relays 20, 21 may only be energized during the same time, and by means of the armature of relay 21 the contact plate 13 is connected only during said period to the contacts 19, but only as long as the succeeding cards keep the contact 22 closed. The contact controlled by relay 20 as well as contact 18 will therefore open once during each machine cycle, however, not simultaneously but with a certain time difference so that the current circuit of the motor 15 will normally be maintained over one of these contacts. After the passage of the last card at 22, the relays 20 and 21 will not be energized since the contact 22 remains open; the contact of the relay 20 will therefore also be open if the contact 18 opens so that the motor circuit is interrupted and the machine is stopped. Each analyzing brush 14 is connected to the first set of storing means which is adapted to control the second set of storing means including in the present instance a translator mechanism; this part of the machine will later be explained more in detail in connection with Fig. 2. To each translator is coordinated a control magnet 42 which, in accordance with the meaning of an analyzed hole combination, releases a differentially timed current impulse within a complete machine cycle. The accumulating and/or printing mechanism may be provided in various ways; in Fig. 1 it has been assumed that the same comprises for each record column a control bar 44 having a ratchet frame 45 as well as a set of types 46. During each machine cycle all control bars 44 are raised once by a reciprocating frame 71 and according to the meaning of the analyzed hole combination, the magnet 42 will be energized at different times thereby releasing in a known manner the latched pawl 47 which will engage the teeth 48 of the control bar 44, thereby stopping the same in its upward movement. At the end of each analyzing cycle the type in printing position is impelled by the type hammer 49 towards the printing platen roller 50, and before the downward movement of the various control bars 44 takes place the accumulator wheels 51 being pivotally mounted upon a frame and having been disengaged from the ratchet frames 45, are rocked in engagement with the latter; consequently, upon the restoring movement of the control bar 44 (said movement taking place at the end of the machine cycle) the printed amount corresponding of course to the meaning of the hole combination will be entered into the accumulator wheel 51. The described accumulating and printing mechanism is well known in the art and is shown more in detail for instance in U. S. Patent 1,791,762 issued February 2nd, 1931, to Pierce, which patent shows already an improvement in such known type of mechanisms.

Figure 2:
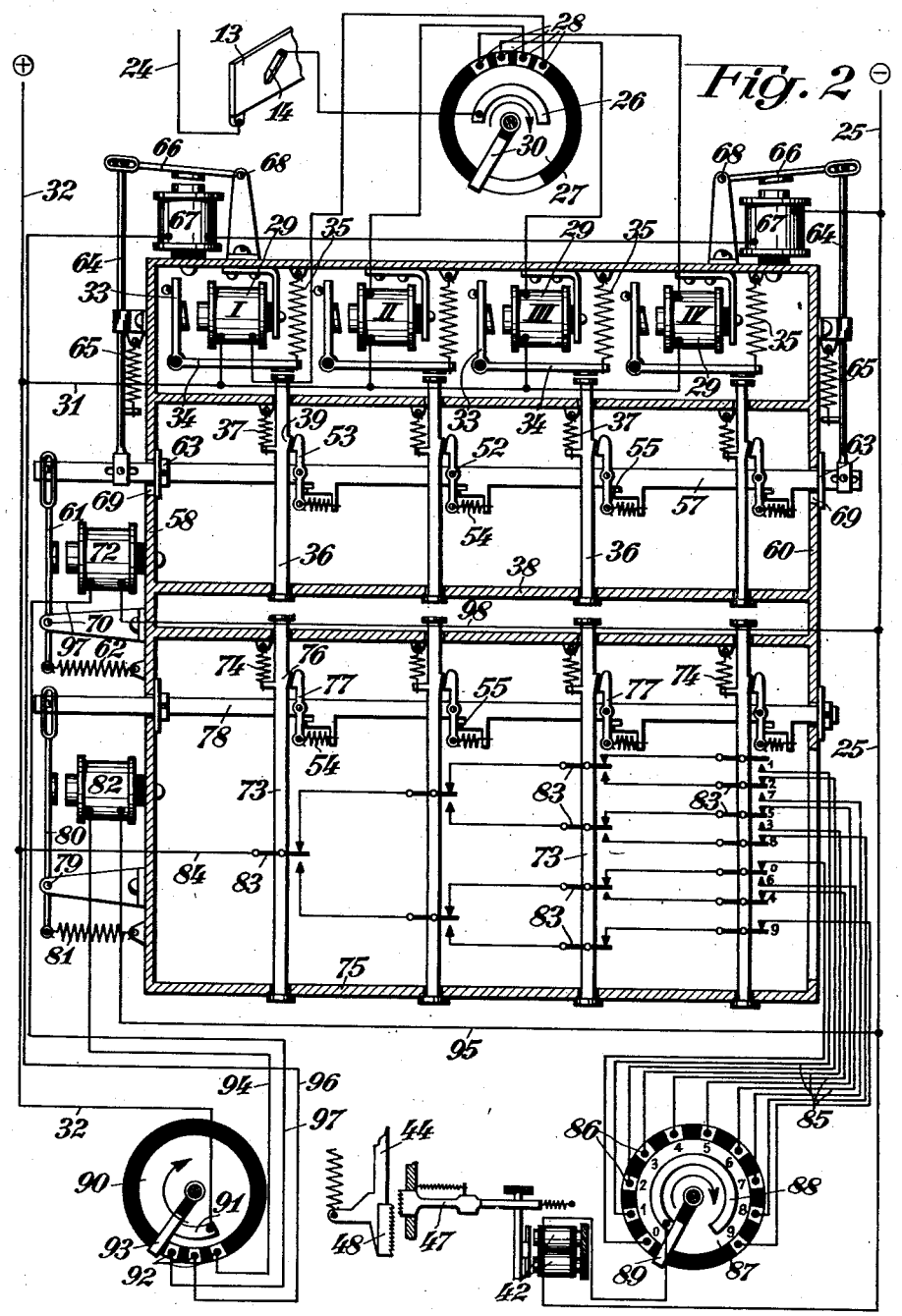
Fig. 2 illustrates diagrammatically two sets of storing means for a single record column and the connection of said storing means with the analyzing means and the type bar controlling means as is also indicated in Fig. 1.

Now the present invention will be explained more in detail in connection with a well known translator mechanism for hole combinations which latter is included in the present instance in the second storing mechanism. A translator of this type is shown for instance in U. S. Patent 1,664,539 to Bryce. Further herein I will call the upper or first set of storing means set-up means and the second set of storing means will be called translator means since this second set acts as translator. The set-up mechanism and the translator are shown in Fig. 2 only for one record column, though the same devices are of course provided for each record column of the card while certain transferring, releasing and restoring means still to be described may be common to a plurality or all columns of a card. In the operation of the machine, the contact plate 13 is connected in a well known manner by line 24 (Fig. 1) over armature of relay 21, contacts 19 and 18 to the right hand side 25 of the current source while the analyzing brush 14 (Fig. 2) is connected to a contact strip 26 of a commutator generally designated by 27. The commutator 27 includes four contact pieces 28 connected by wires to the magnets 29. One complete machine cycle corresponds to the passage of the record card shown in Fig. 4 past an analyzing brush 14 plus the distance between two consecutive cards. During this machine cycle the contact arm 30, shown in Fig. 2 in its normal position, rotates synchronously with the passage of the card past the analyzing brush 14 and if the hole positions of the card pass underneath the brush 14, the contact pieces 28 will be connected in accordance with the passage of said positions under the brush by the arm 30 one by one with the contact strip 26. Each hole in a certain position will release a current impulse leading from the right hand side 25 as above described to line 24 over 13, 14, 26, 30, 28 and the magnet 29 inserted in the circuit in this moment, and then over the common back line 31 of all magnets to the left side 32 of the current source. It will be clearly seen that after a record column has passed under the brush 14, the magnets 29 having the same designation in roman numerals as the perforated hole positions of the analyzed record column, will have been energized. Each magnet 29 controls a bell crank lever 33, 34 which is held by a spring 35 against a stop as illustrated in the drawings. The arm 34 of each bell crank lever has a bar 36 coordinated thereto, said bar being slidably mounted in a casing and being drawn by a spring 37 with its lower end against the bottom plate 38 so that the bar is normally held in the position illustrated in the drawings. Each bar 36 has a catch lip 39 which is just above a pawl 53 pivotally mounted at 52. The pawl 53 is drawn by a spring 54 against a stop 55 as may be seen from the drawings. All pawls 53 of a record column are mounted upon a common bar 57 extending through the side walls 58, 60 to the outside of the casing. The bar 57 is normally drawn to the left by lever 61 and spring 62 so that the flanges 63 engage the walls 58 and 60. The bar 57 is also connected on opposite ends through pin and slot connections with bars 64 drawing the bar 57 by means of springs 65 upwardly. The bars 64 are connected by pin and slot connections with armatures 66 of magnets 67, said armatures being pivotally mounted at 68. If both magnets 67 are simultaneously and instantaneously energized, the bars 64 are moved downwardly and consequently also the bar 57 will be moved downwardly in the slots 69 of the walls 58 and 60 and will return again to their home position under the influence of springs 65 if the magnets 67 are de-energized. The lever 61 being pivotally mounted at 70 is rocked in clockwise direction upon energization of magnet 72 (explained later) and thereby the bar 57 is moved to the right, the lower pins of the bars 64 moving then in the slots of said bar 57.

The mechanism which has now been described, comprising the bars 36, pawls 53 etc., represents the card controlled set of storing means which is adapted to cooperate with the second storing mechanism now to be described which in addition to its functions as storing means serves also as a translator mechanism. The translator mechanism of each record column comprises four bars 73 coordinated to the set-up bars 36. The bars 73 are guided in slots of the translator casing and are drawn by springs 74 with their lower ends against the bottom plate 75 and are thus held in the position illustrated in the drawings. In a similar way as has been explained in connection with the set-up mechanism included in the first set of storing means, each bar 73 has a catch lip 76 adapted to cooperate in a similar way as above described with a pawl 77. The pawls 77 of each record column are mounted upon a common pawl carrier 78 guided in slots of the walls 59, 60 and normally drawn under the influence of a spring 81 to the left by means of a lever 80 pivotally mounted at 79. The bar 78, however, is (unlike the pawl carrier 57) movable only in horizontal direction and is moved to the right upon energization of magnet 82. The bars 73 are provided in a known way with a number of shift contacts 83 which are adapted to select—depending upon the adjustment of the bars 73 in different combinations—a single live line between the line 84 and one of the lines 85. The ends of lines 85 are connected with contact pieces 86 of a commutator generally indicated at 87; the contacts 86 are equally spaced upon the circumference of the commutator 87 corresponding to one complete machine cycle, however, between the first and last contact piece there is a certain blank space corresponding to the distance between two consecutive cards. The control magnet 42 of each record column is connected to a contact strip 88 of the commutator 87. The commutator 87 includes a contact arm 89 rotating once during each machine cycle synchronously with the passage of the card under the brushes and thereby connecting the contacts 86 one by one with the contact strip 88. Since the bars 73 are then adjusted in different combinations depending upon the analyzed hole combination as will later be described, a live line 85 will therefore be selected corresponding to the meaning of the hole combination. If the arm 89 slides over the contact piece 86 of the selected line 85, in the same moment a current impulse will be sent through magnet 42 and since the coordinated control bar 44 raises in the above described manner synchronously with the rotation of arm 89, the bar 44 will be arrested by the released pawl 47 in a position corresponding to the meaning of the analyzed hole combination and consequently an amount corresponding to the meaning of said hole combination will be printed and will also be entered into the accumulator.

For the control of magnets 67, 72 and 82 there is a commutator 90 provided having a contact strip 91 and three adjacent contact pieces 92. The arm 93 of said commutator which is shown in Fig. 2 in its normal position, rotates synchronously with the arms 30 and 89 of the two other illustrated commutators and, as will be clearly seen from the drawings, said arm connects between two consecutive entering operations at first the right hand contact piece 92, then the middle contact piece 92 and finally the left hand contact piece 92 to the contact strip connected to the left hand side 32 of the current source. The right hand contact piece 92 is connected over line 94 to the magnet 82, the back line 95 of which leads to the right hand side 25 of the current source. The middle contact piece 92 is connected over line 96 with two magnets 67 in series, said magnets being also connected to the right hand side 25 of the current source. The left contact piece 92 is connected over line 97 to the magnet 72 having a back line 98 leading also to the right hand side 25. During the synchronous movement of all commutator arms 30, 89 and 93, the contact arm 89 will analyze the contacts 86 during almost the whole machine cycle while about in the middle portion of the machine cycle the contacts 28 (corresponding to the arrangement of the hole positions upon the card according to Fig. 4) are analyzed by the contact arm 30 and during the period between two consecutive entering operations the contact arm 93 will energize at first the magnet 82, then over line 96 the two magnets 67 and thereupon the magnet 72.

Now the operation of the various parts will be explained more in detail in connection with the operation of the whole machine. If the machine is in normal position all parts are in the position as shown in the drawings. If the machine is then started and the hole combination column of the first record card passes under the brush 14 the arm 30 will connect the contacts 28 one by one and the magnets 29 will be instantaneously energized in accordance with the passage of the holes of the column under the brush. Through this energization the coordinated bell crank levers 33, 34 will momentarily be rocked in clockwise direction thereby pressing their control bars 36 downwardly, the nose 39 of each bar snaps then under the latch 53 so that the bar will be retained when the arm 33, 34 returns to its normal position under the influence of spring 35. At the end of the passage of a hole combination past the analyzing brush 14 the control bars 36 will therefore be adjusted or set up in the same way, i. e. either singly or in different combinations as determined by the holes of the record column which has passed under the brush. During the first machine cycle, however, also the arm 89 has been rotated and the contacts 86 will have been analyzed one by one. Since, however, the translator bars 73 remain during this cycle in their illustrated home position in which no connection between line 84 and any one of the lines 85 exists, the magnet 42 will receive no current impulse during the first cycle so that the registering mechanism performs an idle cycle. An actuated control bar 36 is pressed by its magnet 29 so far downwardly and is held by the latch 53 in such a position that its lower end is just above the head of the coordinated bar 73, however, without engaging the same so that the respective bar 73 is not influenced by the movement of bar 36 which is due to the energization of magnet 29. Now, at the end of the first entering operation and before the beginning of the second entering operation the three contacts 92 of the commutator 90 will be connected one by one with the contact strip 91; this causes at first a current impulse over line 94 to the magnet 82 thereby energizing the same and moving the pawl carrier 78 to the right. This movement serves to release all control bars 73 which have been latched in the previous machine cycle. Since, however, during the first machine cycle no control bars 73 have been adjusted there will also be no release in this moment and the movement of the bar 78 to the right at the end of the first machine cycle will be an idle movement. Thereupon the two magnets 67 will be simultaneously energized over line 96 thereby moving the control bar 57 downwardly by means of bars 64. It has already been explained that the bars 36 are kept in latched position in a combination corresponding to the hole combination contained in the column of the preceding card and that the lower ends of the actuated set-up bars are just above the heads of the coordinated bars 73 while the bars 36 which have not been set up will remain in their illustrated position. Consequently, if the bar 57 is moved downwardly the actuated set-up bars 36 press their coordinated translator bars 73 downwardly which will then be held latched in the lower position. If therefore after deenergization of the magnets 67 the control bar 57 has again returned to the illustrated position, the adjustment of the bars 36 will have been transferred to the bars 73 and these bars will then be adjusted in accordance with the hole combination which has passed under the brush and they will select a current circuit over one of the lines 85, the selected line corresponding to the meaning of the hole combination; however, this circuit will not yet be effective since there is no conducting connection between the contacts 86 and the contact strip 88. Upon the further movement of arm 93 between two consecutive machine cycles the magnet 72 will be energized over line 97 and consequently the control bar 57 will be moved to the right; the bar 57 is held during said movement in the illustrated horizontal position by bars 64. Consequent to this movement of bar 57 to the right, the pawls 53 are disengaged from the noses 39 so that all latched bars 36 are permitted to return under the influence of springs 37 to normal position. It will be clearly seen that before the beginning of the second machine cycle the translator bars 73 are adjusted corresponding to the hole combinations of the previous card and that the set-up bars 36 are in their normal position in which they are ready to be set up by the hole combinations of the following card. Now, during the second machine cycle, reading out of the adjustment of the translator is effected by the arm 89 and it will be clearly seen that for this reading out operation the whole machine cycle is available so that the accumulating and printing mechanism must only operate at a limited speed and strain, or in other words, that upon using the full capacity of speed a very high efficiency of the machine as regards the number of cards running through the machine in a certain time unit may be obtained. During the second machine cycle the magnet 42 will therefore be controlled in a sense corresponding to the meaning of the hole combinational column of the previous card and during the same machine cycle the commutator 27 effects the control of the set-up bars 36 corresponding to the hole combination of the second card which now follows.

These operations will now cyclically continue as long as cards are passing through the machine, i. e. during one machine cycle the set-up bars 36 are adjusted corresponding to a hole combination; at the end of the entering operation the bars 73 are released by magnet 82 from the previous adjustment and thereupon the adjustment of the set-up bars 36 is transferred to the bars 73 (the new adjustment of which is then read out during the following machine cycle) and after the transferring operation the bars 36 are released to free the same for the set-up by the following hole combination. If the card supply is exhausted the machine is automatically stopped in the above described manner; a further machine cycle will then be necessary in order to read out the adjustment of the translator from the last card; for this purpose the start key may again be depressed after the automatic stop as is usual in record card controlled machines; or the machine may be held automatically in operation for one machine cycle longer, for instance by means of a delaying mechanism similar to that shown in my U. S. Patent 1,955,819.

Total taking of the accumulated data may be effected in the way as is well known in the described kind of machines; the machine may be stopped by intermediate or stop cards and total taking may then be caused either manually or automatically, if desired the total may also be taken at the end of accumulation of the data of all cards, and the accumulator wheels might be provided with number wheels to permit reading of the accumulated data and noting the same by hand.

As has been mentioned above, the set-up and the translator parts are provided individually for each record column and the translator parts include also latchable means similar to the set-up means of the card controlled storing mechanism. In the above described embodiment the parts 36, 73, 29, 27, 87 and 42 must therefore be provided individually for each record column while the magnets 67, 72, 82 and commutator 90 are common to all record columns and the parts 66, 64, 57, 61, 78, 80 being controlled by said magnets may be provided as control members which are common to all record columns.

While there have been shown and described and pointed out the fundamental novel features of the invention as applied to a single modification it will be understood that various omissions and substitutions and changes in the form and details of the machine illustrated and in its operation may be made by those skilled in the art without departing from the spirit of the invention.

What I claim is:

1. In a cyclically operable combinational hole record card controlled tabulating machine wherein one card passage corresponds to one machine cycle, analyzing means for said record cards, an entry-receiving accumulating mechanism controlled in one machine cycle in accordance with the combinational hole perforations of a record card analyzed in the preceding machine cycle, a first set of storing means for retaining the result of the analysis, said analyzing means controlling upon each card passage the same first set of storing means, a second set of storing means also adapted to retain the result of the analysis and including translator means for the combinational hole perforations, said translator means controlling in each machine cycle said accumulating means, means operative between consecutive entering operations for clearing at first said second set of storing means, means for controlling then said second set of storing means by said first set of storing means and means for clearing then said first set of storing means before control of the same by the analyzing means upon analysis of the subsequent card.

2. In a cyclically operable combinational hole record card controlled tabulating machine, wherein one card passage corresponds to one machine cycle, analyzing means for the record cards passing one by one in motion past said analyzing means, an entry-receiving accumulating mechanism controlled in one machine cycle in accordance with the combinational hole perforations of a record card analyzed in the preceding machine cycle, a first set of storing means adapted to retain the result of the analysis, said analyzing means controlling upon each card passage through the machine the same first set of storing means, the analyzing operation lasting only a fraction of the whole machine cycle, a second set of storing means also adapted to retain the result of the analysis and including translator means for the combinational hole perforations, said accumulating mechanism being in each machine cycle during substantially the whole cycle under the control of said translator means, means operative between consecutive entering operations for clearing at first said second set of storing means, means for controlling then said second set of storing means by said first set of storing means and means for clearing then said first set of storing means before control of the same by the analyzing means upon analysis of the subsequent card.

3. In a cyclically operable combinational hole record card controlled tabulating machine wherein one card passage corresponds to one machine cycle, analyzing means for said record cards, an entry-receiving accumulating mechanism controlled by said analyzing means in one machine cycle in accordance with the combinational hole perforations of a record card analyzed in the preceding machine cycle, a first set of latchable set-up members for retaining the result of the analysis, the latches for said set-up members being mounted on common latch carriers, said analyzing means controlling upon each card passage the same first set of set-up members, a second set of latchable set-up members also adapted to retain the result of the analysis and including translator means for the combinational hole perforations, said translator means controlling in each machine cycle said accumulating means, the latches of said second set of set-up members being also mounted on common latch carriers, means operative between consecutive entering operations for unlatching at first said second set of set-up members, means for moving then the latch carriers of said first set of set-up members together with the latched set-up members towards the second set of set-up members to latch the latter members in accordance with the latched members in the first set, and means for unlatching then the set-up members of said first set.

MICHAEL MAUL.